US005165167A

United States Patent [19]

Dechelette

[11] Patent Number: 5,165,167

[45] Date of Patent: Nov. 24, 1992

[54] PRESS TOOL FOR CUTTING CONDUCTORS AND TERMINATING ELECTRICAL CONNECTORS

[75] Inventor: Helen Dechelette, Wissous, France

[73] Assignee: Molex Incorporated, Lisle, Ill.

[21] Appl. No.: 750,140

[22] Filed: Aug. 26, 1991

[30] Foreign Application Priority Data

Sep. 18, 1990 [DE] Fed. Rep. of Germany ....... 4029582

[51] Int. Cl.[5] ........................ H01R 43/04; B23P 19/00

[52] U.S. Cl. .................................... 29/861; 29/566.3; 29/749; 29/758

[58] Field of Search ...................... 29/751, 566.3, 749, 29/758

[56] References Cited

U.S. PATENT DOCUMENTS

| | | | |
|---|---|---|---|
| 4,040,179 | 8/1977 | Sanchez | 29/751 X |
| 4,506,440 | 3/1985 | Rommel | 29/751 |
| 4,545,635 | 10/1985 | Bunnell | 29/751 X |
| 4,796,358 | 1/1989 | Long, Jr. et al. | 29/749 X |
| 4,825,530 | 5/1989 | Komuro | 29/751 X |
| 4,965,923 | 10/1990 | Kumazawa | 29/749 X |
| 5,074,032 | 12/1991 | Anderson | 29/749 |

*Primary Examiner*—Carl J. Arbes

*Attorney, Agent, or Firm*—A. A. Tirva

[57] ABSTRACT

The invention is directed to a press tool for assembling and terminating electrical connector assemblies. The connector assemblies include a plurality of wires, a first housing component, a mateable second housing component and a plurality of terminals located within the connector assembly which can be simultaneously mass terminated to a portion of wire located within each terminal as a result of the mating of the housing components. Each portion defines an axis. The press tool comprises a first housing component support means for supporting the first housing component and cutting means for cutting each of the wires to a predetermined length. Spacer means is positioned between the first housing component support means and the cutting means for establishing the predetermined length of wire. Second housing component support means are also provided for supporting the second housing component. Moving means is provided for moving the second housing component relative to the first housing component in a direction parallel to each of the axes to mate the first and second housing components ɔgether and thereby terminate each terminal to an individual wire.

18 Claims, 8 Drawing Sheets

50
I
II
58
5
8
4
11
19
10
2
3
9
52
13
16
12
14
1
62
15

PRESS TOOL FOR CUTTING CONDUCTORS AND TERMINATING ELECTRICAL CONNECTORS

FIELD OF THE INVENTION

This invention relates generally to the art of termination tools for electrical connectors and, more particularly, to a press tool for cutting conductors and terminating electrical connectors to those conductors.

BACKGROUND OF THE INVENTION

Multi-conductor electrical connectors have been used for many years and have been provided in a wide variety of configurations for mass-terminating a plurality of terminals to the conductors of a multi-conductor electrical cable. One type of electrical connector is disclosed in U.S. Pat. No. 4,955,816 to Roberts et al., dated Sep. 11, 1990 and assigned to the assignee of this invention. That electrical connector includes a plurality of terminals which are mounted in a housing comprised of front and rear housing components. The terminals may be mass-terminated by inserting a plurality of wires into the housing through the rear housing component and by axially advancing the rear housing component relative to the front housing component. A terminal that is particularly useful with that electrical connector is disclosed in U.S. Pat. No. 4,512,619 to Dechelette, dated Apr. 23, 1985 and assigned to the assignee of this invention. Such terminal includes a collapsible insulation displacement portion that terminates a conductor in response to a force directed axially along the length of a wire received within the terminal.

In applications such as the telecommunications industry, the wires being terminated are extremely small which makes handling and trimming the wires difficult. Further, because of their small size, the wires lack rigidity which complicates the process of determining whether the wires are fully inserted into the connector assembly.

This invention is directed to providing a press tool for use with multi-conductor electrical connectors that also has the ability to cut the conductors of the connector prior to termination.

SUMMARY OF THE INVENTION

The invention is directed to a press tool for assembling and terminating electrical connector assemblies. The connector assemblies include a plurality of wires, a first housing component, a mateable second housing component and a plurality of terminals located within the connector assembly which can be simultaneously mass terminated to a portion of wire located within each terminal as a result of the mating of the housing components. Each portion defines an axis. The press tool comprises a first housing component support means for supporting the first housing component and cutting means for cutting each of the wires to a predetermined length. Spacer means is positioned between the first housing component support means and the cutting means for establishing the predetermined length of wire. Second housing component support means are also provided for supporting the second housing component. Moving means is provided for moving the second housing component relative to the first housing component in a direction parallel to each of the axes to mate the first and second housing components together and thereby terminate each terminal to an individual wire.

BRIEF DESCRIPTION OF THE DRAWINGS

The features of the present invention are set forth with particularity in the appended claims. The invention, together with the objects and advantages thereof, may best be understood by reference to the following description taken in conjunction with the accompanying drawings in which:

DETAILED DESCRIPTION OF THE PREFERRED EMBODIMENT

Figure 1:
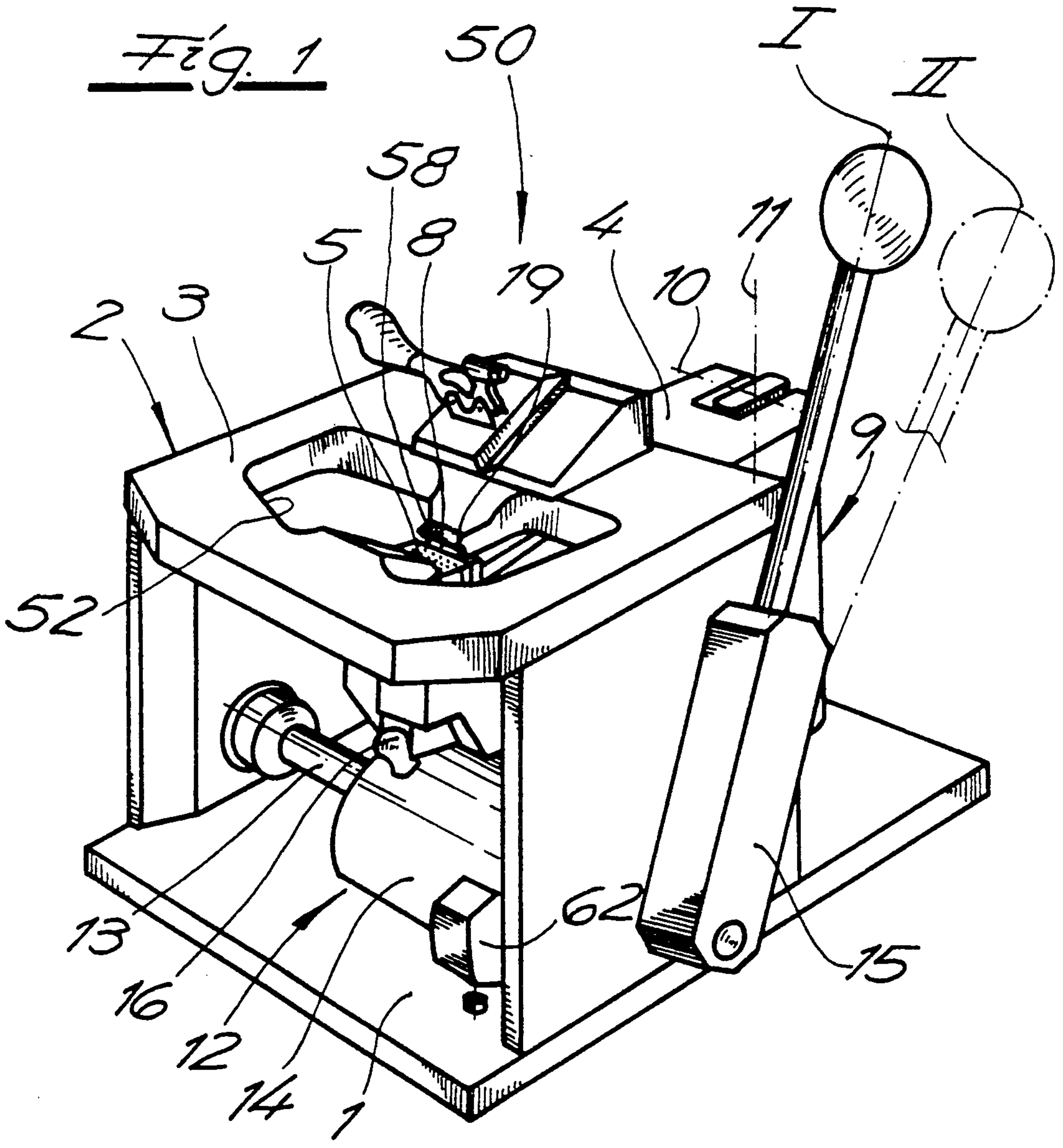
FIG. 1 is a front perspective view of the press tool of the present invention.
Figure 2:
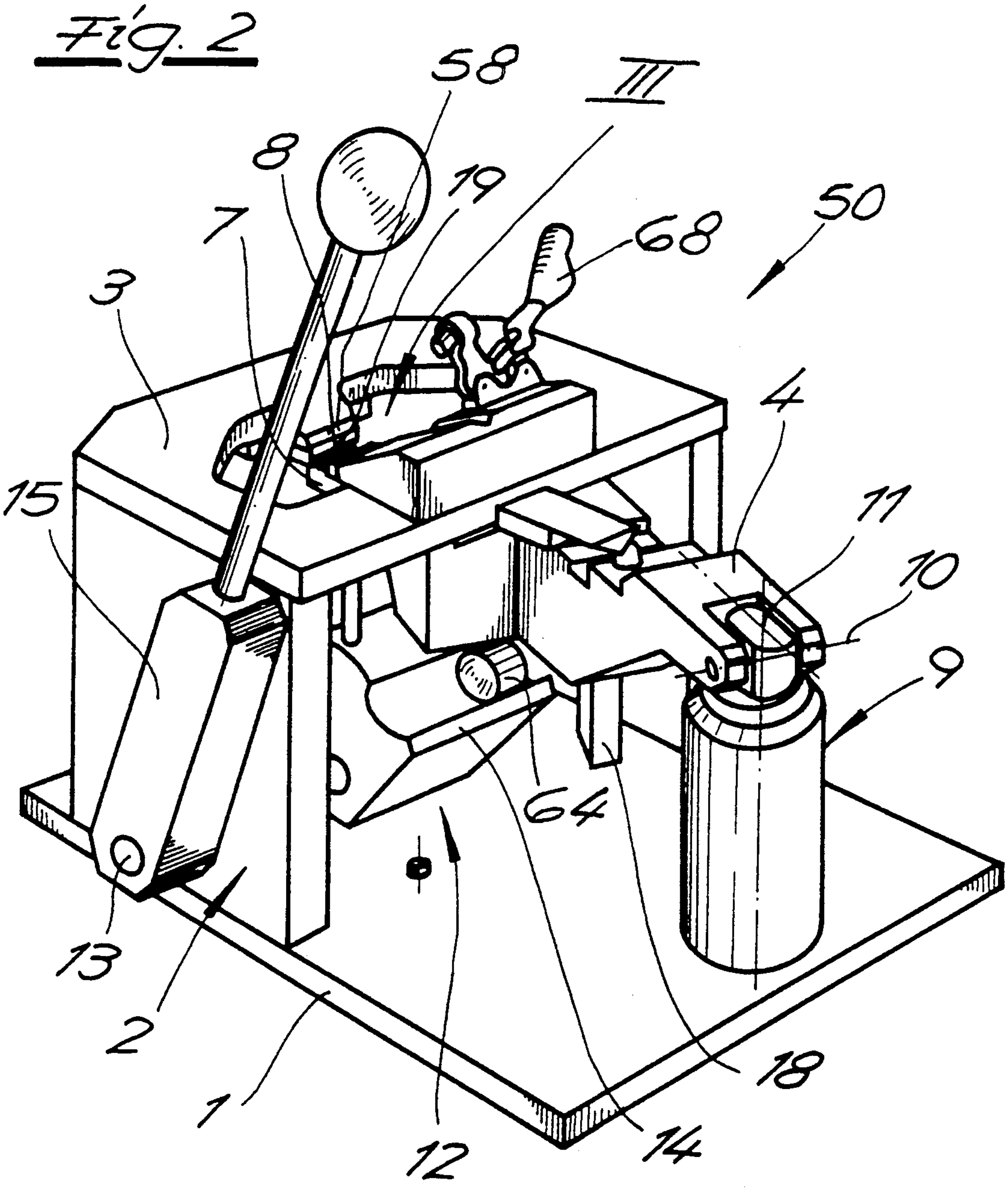
FIG. 2 is a rear perspective view of the press tool of FIG. 1.

The press tool of the present invention generally designated 50 in FIGS. 1-5 is utilized for terminating electrical connectors of the type shown in FIGS. 6-10 to a plurality of wires 22 contained within a multi-conductor cable 21. FIGS. 6-10 depict an electrical connector 40 having a plurality of terminals indicated generally at 23 which are positioned between two pieces of the housing, the housing top component 25 and the housing bottom component 26. The top component 25 has inlet channels indicated generally at 27 through which the ends of conductors 22 are inserted. The bottom component 26 has openings indicated generally at 28 in which the terminals 23 are positioned and into which mating terminals project when mating with terminals 23.

Figure 10:
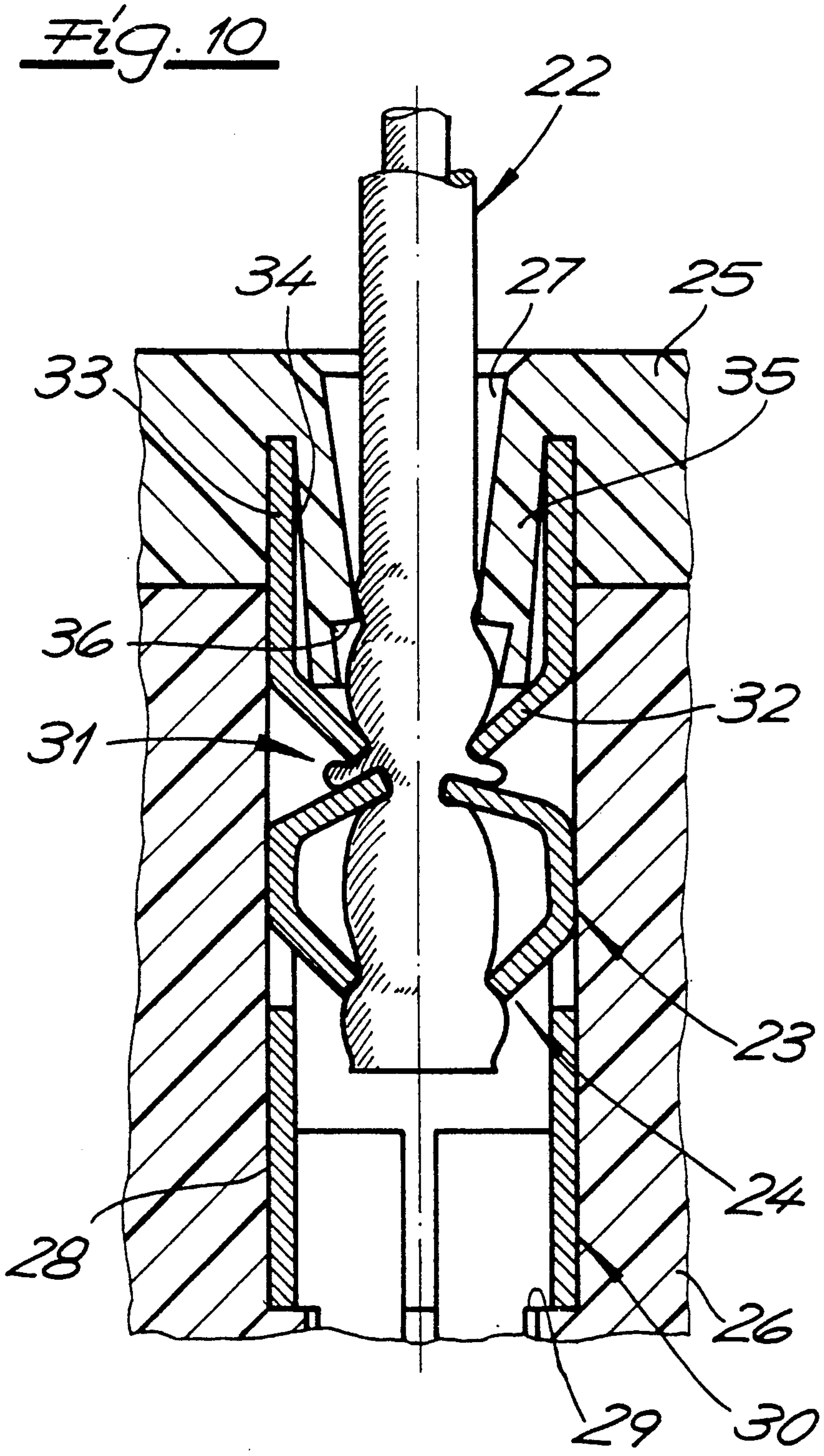
FIG. 10 is an enlarged sectional view of a terminal utilized with the press tool of the present invention in which the terminal has been terminated to a conductor.

As shown in FIG. 10, each terminal 23 includes side walls 30 with contact connection zones indicated generally at 31 wherein contact lugs 32 are formed. These lugs 32 are dimensioned so that upon moving the ends of the terminal towards each other in an axial direction, the contact lugs 32 displace the insulation surrounding conductor 22 so that the contact lugs 32 make an electrical and mechanical connection to conductor 22. The top portion 33 of terminal 23 contacts top housing component 25, and the bottom end portion 30 of terminal 23 contacts the inner shoulder 29 of bottom housing component 26 so that upon forcing the top and bottom housing components 25 and 26 towards each other along an axis generally parallel to the longitudinal axis of the terminal, the collapsible portion 31 of the terminal collapses effecting a type of insulation displacement termination with conductor 22. Upon such termination, the upper contact lugs contact the inner portion 35 of the top housing component 25 so that shoulder 36 of each inner portion 35 contacts the insulation of the conductor 22 in order to act as a strain relief. Thus, it can be seen that in order to carry out the termination of the terminals 23 contained within electrical connector 40, the top housing component 25 and the bottom housing component 26 must be moved towards each other.

Referring to FIG. 1, the press tool 50 of the present invention is shown. The press tool includes a frame, generally designated 2, a tool carrier, generally designated 4, and a control and operating mechanism, generally designated 12. The frame 2 includes a base plate 1 and a frame table 3. The frame table 3 has openings 52 for loading the connector components 25 and 26 and into which the conductors 22 extend during operation. The frame table 3 also has a top housing component receptacle 8 which is defined by a pair of spring loaded jaws 19. These jaws are biased towards the center of receptacle opening 8. The jaws each include a tapered lead-in portion 58 and a pair of shoulders (not shown) to define an opening between the lead-in portion 58 and the shoulders and into which flanges 60 (FIGS. 7 and 8) are positioned in order to secure the top housing component 25 during the operation of the press tool. In addition, the jaws 19 can also act to absorb excess crimping forces.

Figure 3:
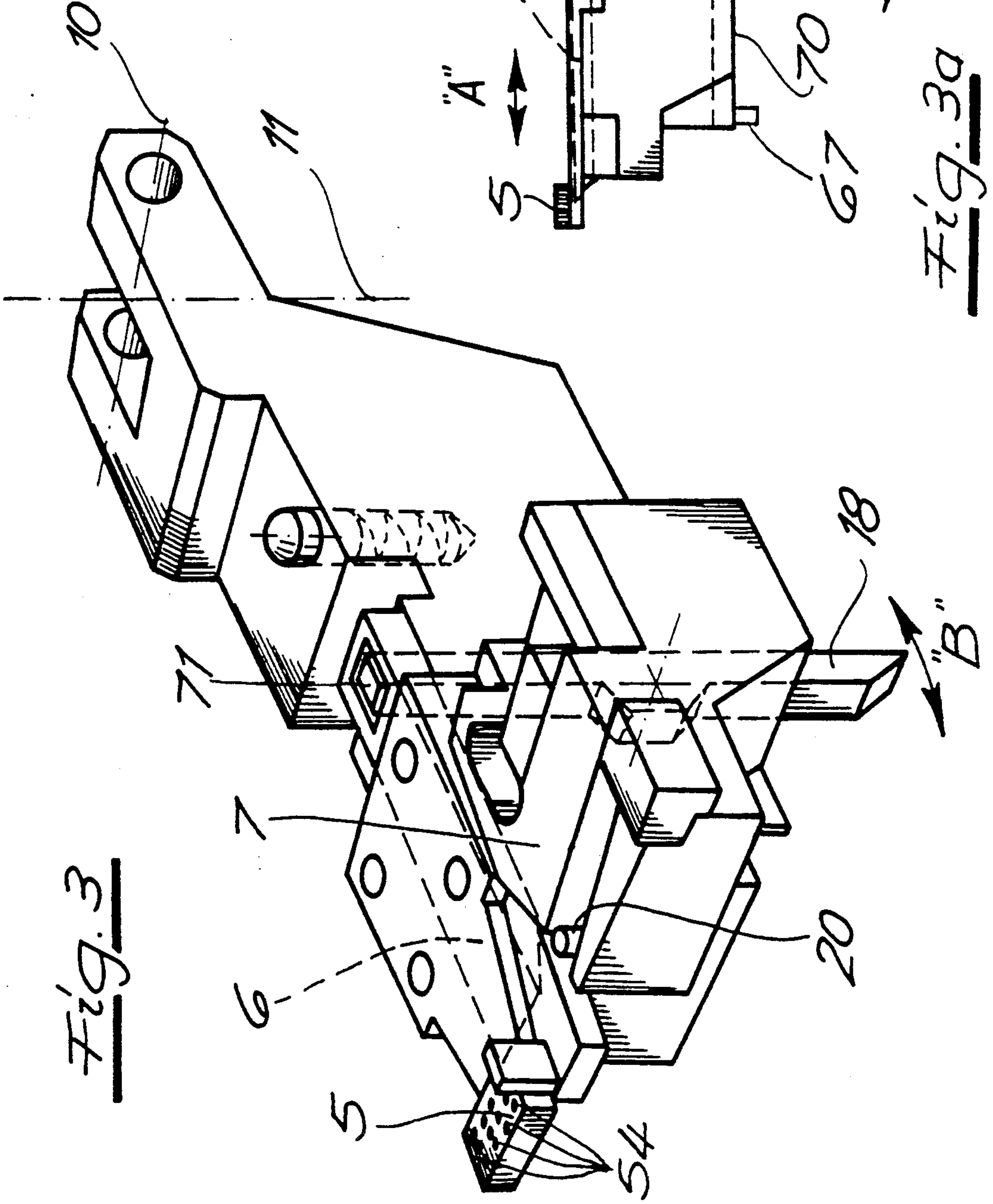
FIG. 3 is a front perspective view of the tool carrier of the present invention.
Figure 3A:
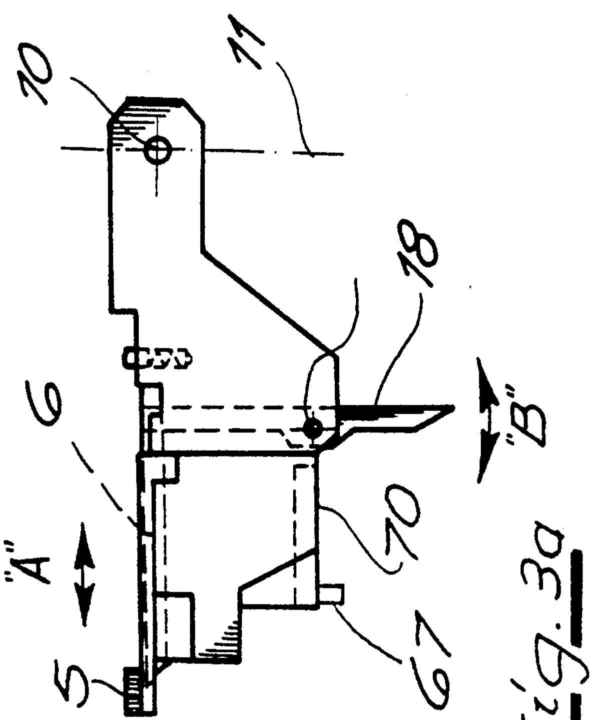
FIG. 3*a* is a side elevational view of the tool carrier of FIG. 3.

The tool carrier 4, best shown in FIGS. 3 and 3*a*, includes a conductor end receptacle and spacer block 5, a cutting blade 6 and a bottom housing component receptacle 7. The receptacle and spacer block 5 includes a plurality of bores 54 therethrough into which the ends of conductors 22 are positioned prior to termination of the connector 40. Blade 6 is slidably positioned within tool carrier 4 and is movable in the direction of double arrowhead "A" in FIG. 3*a* due to the rotation of the linkage lever 18 about its pivot point 56 as shown by double arrowhead "B" in FIGS. 3 and 3*a*. Tool carrier 4 includes a spring that biases blade 6 and linkage lever 18 so that their normal position is as shown in FIG. 3*a*. Receptacle 7 receives and supports the bottom housing component 26 with the terminals 23 positioned therein.

Tool carrier 4 is supported at one end by support member 9 and at the other by control and operating mechanism 12. The tool carrier can rotate around a horizontal axis 10 through support member generally designated 9 as well as around a vertical axis 11. Support member 9 is mounted to base plate 1.

Figure 4:
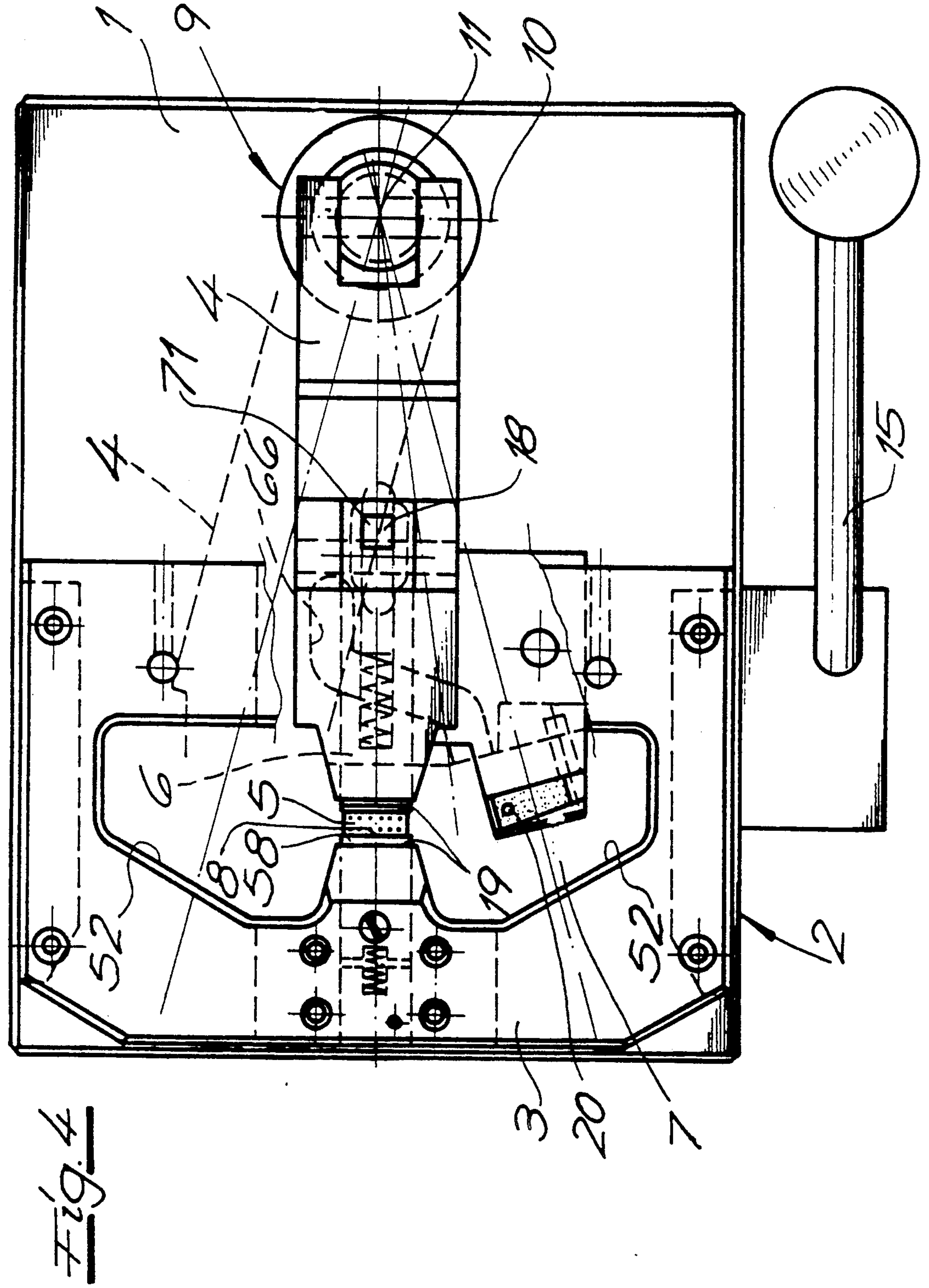
FIG. 4 is a top plan view of the press assembly of FIG. 1.

Control and operating mechanism 12 includes a control block 14 which is fixed to shaft 13 that is rotatably mounted to frame 2. Operating lever 15 is fixed to shaft 13 so that the operation of operating arm 15 rotates the control shaft 13 and control block 14. Control block 14 includes a first cam 62, a roller 64 which acts as a second cam and an S-shaped slot 66 (FIG. 4). A spring loaded follower pin 67 depends downwardly from tool carrier 4 and is received within slot 66 so that during the rotation of control block 14, the pin slides within slot 66 in order to move bottom housing component receptacle 7 from its loading position as shown in FIG. 4 to position it beneath top housing component receptacle 8 immediately prior to termination of the connector. The pin 67 is spring loaded so that it remains within slot 66 as tool carrier 4 is rotated about its horizontal axis 10.

Figure 5:
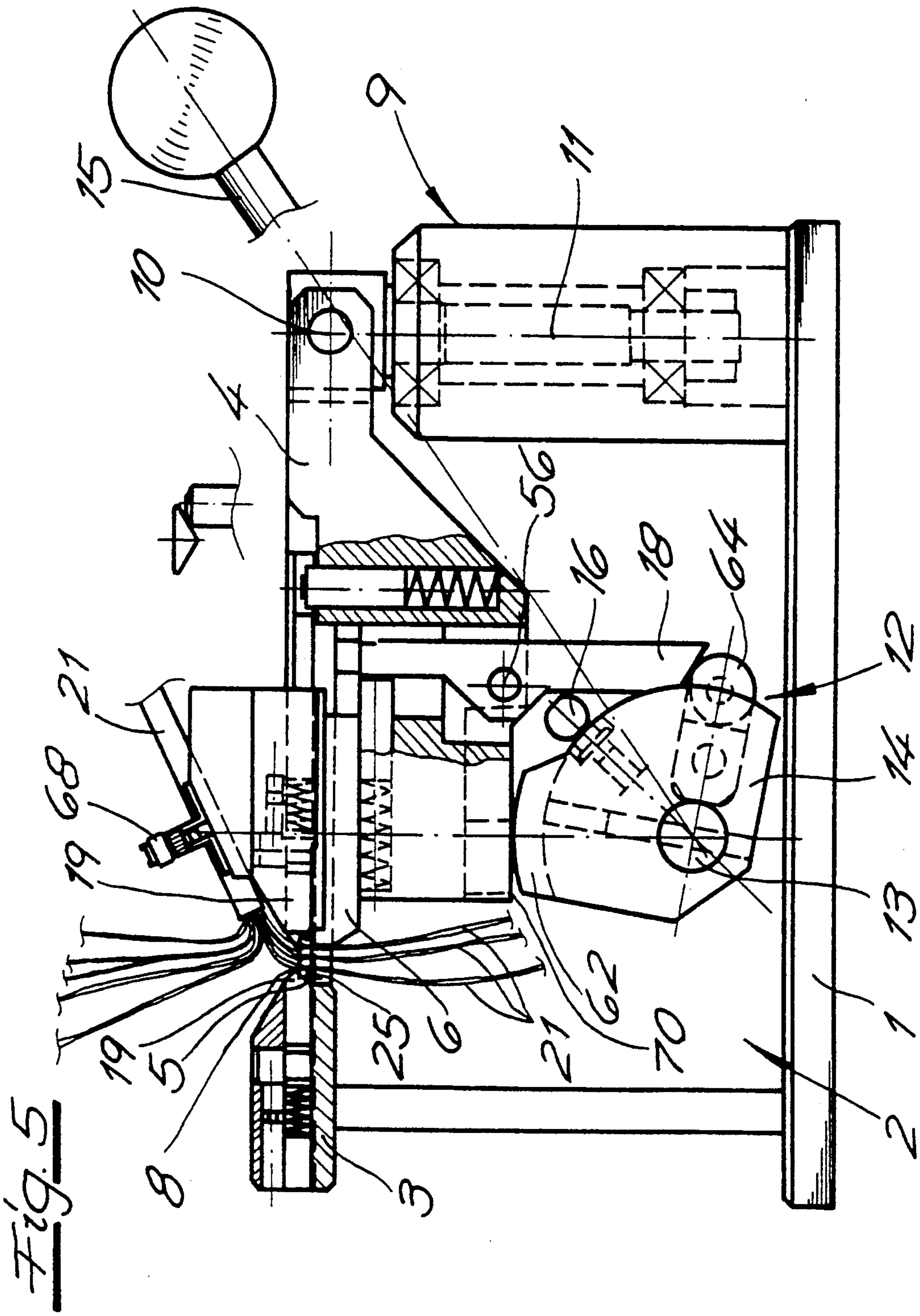
FIG. 5 is a side elevational view, partially in section, of the press assembly showing wires inserted into the top housing component of a connector terminated by the press tool of the present invention.
Figure 6:
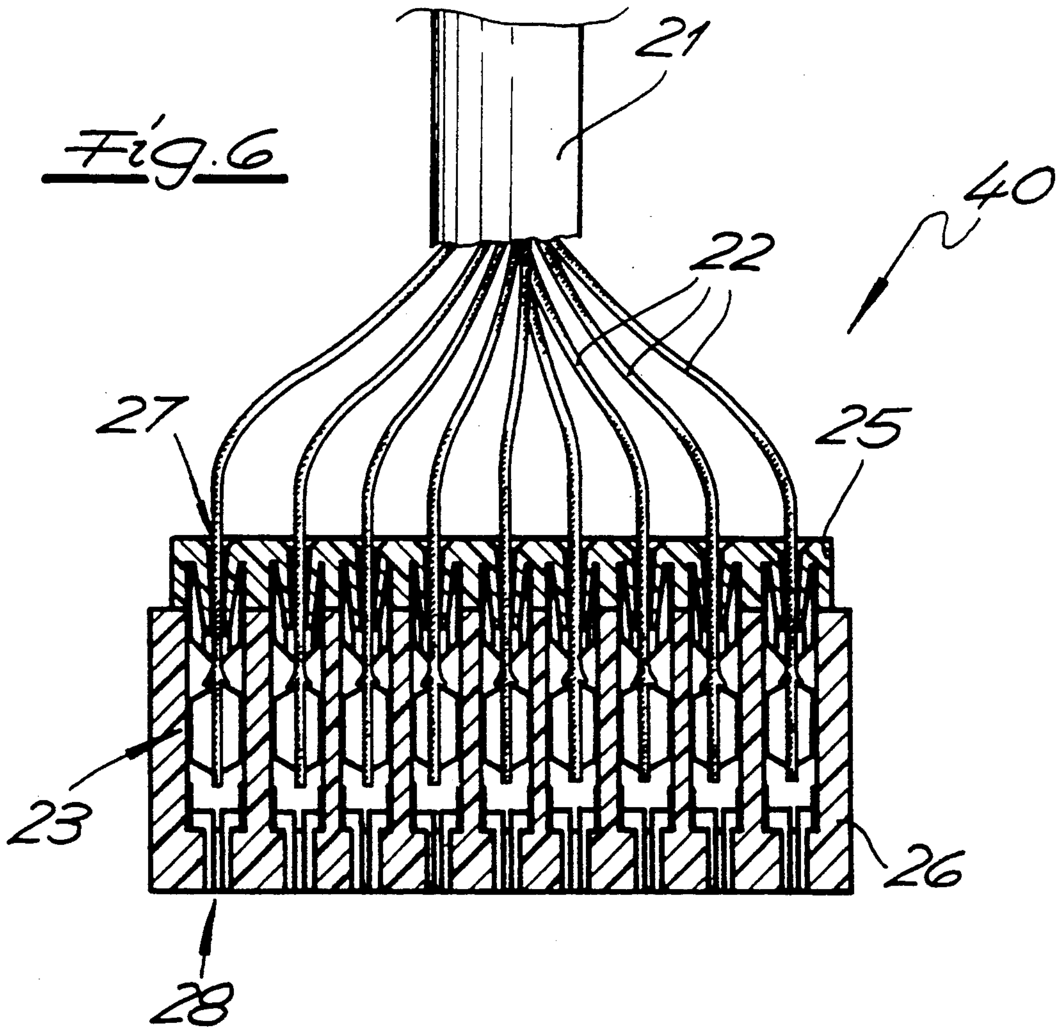
FIG. 6 is a horizontal sectional view of the electrical connector terminated by the present invention.
Figure 7:
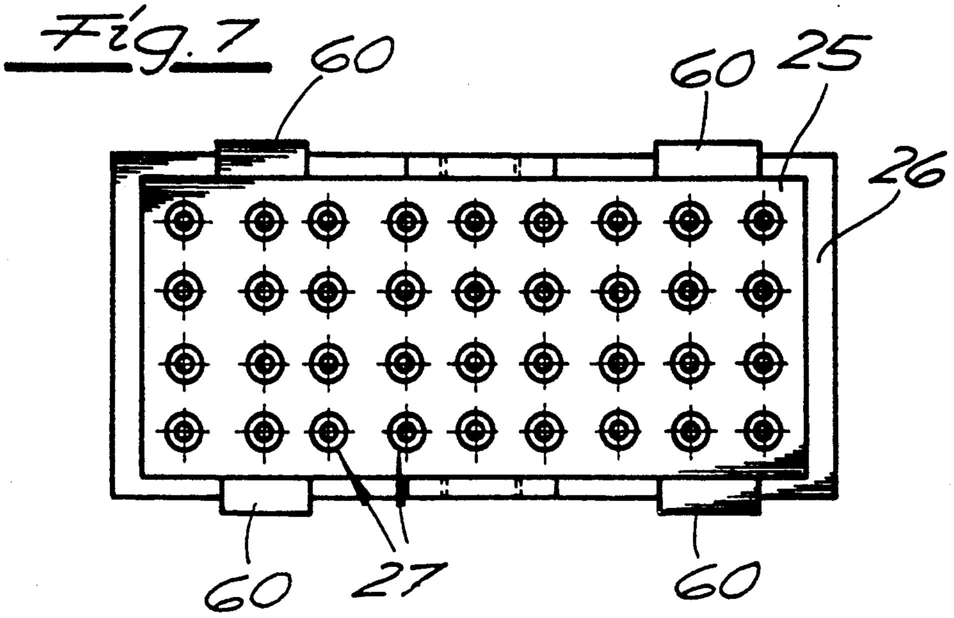
FIG. 7 is a top plan view of the electrical connector of FIG. 6 with the conductors removed.
Figure 8:
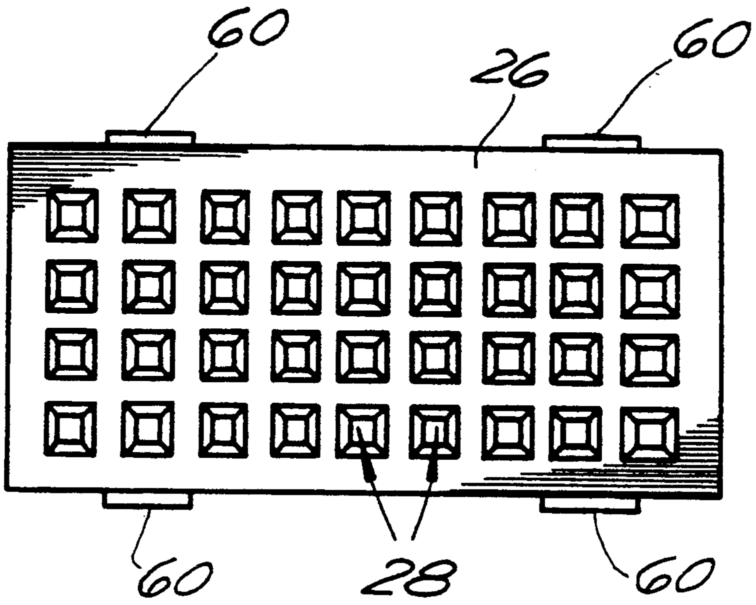
FIG. 8 is a bottom view of the electrical connector of FIG. 6.
Figure 9:
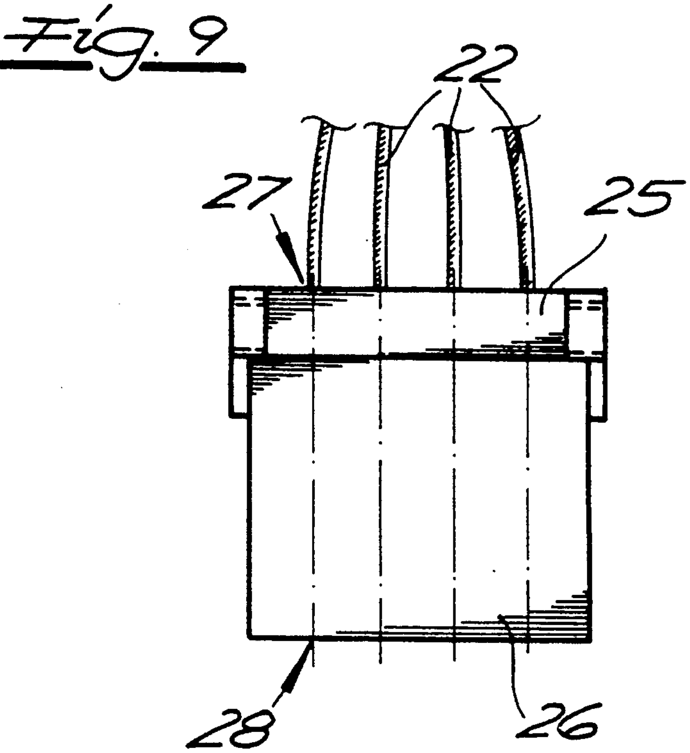
FIG. 9 is a side elevational view of the electrical connector of FIG. 6.

In operation, the press tool is positioned with operating arm 15 located at position II. At such time, tool carrier 4 is positioned as shown in FIGS. 3*a*, 4 and 5 with the receptacle and spacer block 5 positioned beneath top housing component receptacle 8 and bottom housing component receptacle 7 accessible through opening 52. The top housing component 25 is pressed into contact with jaws 19 which forces the jaws away from the center of receptacle 8 until the flanges 60 on the top housing component 25 pass the lead-in 58 of the jaws. The component 25 is then secured in receptacle 8 between jaws 19. Bottom housing component 26 is inserted through opening 52 into receptacle 7. At such time, first cam 62 (see FIG. 5) is maintaining tool carrier 4 in its upward, horizontal position. Multi-conductor cable 21 is then positioned within cable holder 68 which is mounted on frame table 3 and each of the desired conductors 22 are fed through the openings 27 in the top housing component 25 and through the bores 54 in block 5 as shown in FIG. 5.

Operating lever 15 is then rotated from position II to position I which rotates control block 14 in a counterclockwise direction as viewed in FIG. 5. The rotation of control block 14 forces roller 64 upward which contacts linkage lever 18 and causes it to rotate about pivot point 56 so that the top portion 71 of linkage arm 18 engages blade 6 and moves it to the left as viewed in FIG. 5, cutting all of the wires that are positioned in block 5. The sliding action of blade 6 cuts the wires row by row until all of the wires are trimmed to the desired, predetermined length. During the rotation of control block 14, the following pin 67 travels along a straight portion of slot 66 so that there is no movement of tool carrier 4 about axis 11 between positions II and I.

As operating arm 15 is further rotated counterclockwise as viewed in FIG. 5, control block 14 also rotates such that first cam 62 no longer supports the lower surface of tool carrier 4 and the tool carrier is forced downward by a spring and rotates about axis 10 so that it is in contact with the arcuate surface of control block 14. Continued rotation of operating arm 15 causes the follower pin 67 to slide through the S-shaped groove 66 which causes the tool carrier 4 to rotate about axis 11 until it reaches the position partially shown in phantom in FIG. 4. Such movement aligns housing bottom component 26 with housing top component 25 along their axis of mating. Continued rotation of the operating lever 15 in the counterclockwise direction as viewed in FIG. 5, forces roller 64 to contact the lower surface of tool carrier 4 and forces the tool carrier upward about axis 10 which drives the housing bottom component 26 towards housing bottom component 25 along their mating axis so that the two mate together and terminate the terminals 23 to the conductors 22 as described above.

It will be understood that the embodiment of the present invention which is described herein is merely illustrative of an application of the principles of the invention. Modifications may be made by those skilled in the art without departing from the spirit and scope of the invention.

I claim:

1. A method of manufacturing an electrical connector assembly which includes a plurality of wires, a first housing component, a mateable second housing component, and a plurality of terminals positioned within the connector assembly, said terminals being simultaneously mass terminateable to a portion of wire located within each terminal as a result of the mating of the housing components along a first axis, said portions of wire defining a plurality of second axes, each second axis being generally parallel to said first axis, comprising the steps of:

providing said first housing component having a plurality of openings therein to define an array of rows;

inserting a plurality of wires through said openings in said first housing component;

simultaneously cutting each row of wires to a predetermined length;

aligning said second housing component along said first axis; and moving said second housing component along said first axis and relative to said first housing component to mate the first and second housing components together thereby terminating each terminal to an individual wire.

2. The method of claim 1 further comprising the step of providing a spacer member adjacent said first housing component for establishing a predetermined length of wire to be inserted into said connector assembly.

3. The method of claim 2 wherein said spacer member includes a plurality of bores and said insertion step includes inserting said wires through said bores.

4. The method of claim 2 further comprising the step of moving said spacer member away from said first housing component to permit the mating of said first and second housing components.

5. The method of claim 1 further comprising the step of moving said second housing component from a second housing component loading station to a housing mating position, said housing mating position being located along said first axis.

6. A press tool for assembling an electrical connector assembly which includes a plurality of wires, a first housing component and a mateable second housing component, and for simultaneous mass termination f a plurality of terminals within the connector assembly to a portion of wire located within each terminal as a result of the mating of the housing components, each said portion defining an axis, said press tool comprising:

a frame;

first housing component support means on said frame for supporting said first housing component;

cutting means operatively associated with said first housing component support means for cutting each of said plurality of wires to a predetermined length;

spacer means movable from a first position between said first housing component support means and said cutting means for supporting said predetermined length of wire while said cutting means cuts said plurality of wires and a second position spaced from said first housing component support means;

second housing component support means for supporting said second housing component operatively associated with said first housing component support means;

means for moving said second housing component from a first pre-termination position space from said first housing component to a second terminated position by moving said second housing component relative to said first housing component in a direction parallel to each of said axes to mate said first and second housing components together and thereby terminate each said terminal to an individual wire.

7. The press tool of claim 6 further comprising first moving means operatively associated with said cutting means and said spacer means for moving said cutting means and said spacer means relatively away from said first housing component support means to permit said first and second housings to mate.

8. The press tool of claim 7 wherein said spacer means includes a plurality of bores through which said plurality of wires are located while said cutting means cuts said plurality of wires.

9. The press tool of claim 7 further comprising second moving means operatively associated with said second housing component support means for moving said second housing component support means from a second housing component loading station to said first pre-terminated position at which said second housing component is located along said axes.

10. A press tool for assembling an electrical connector assembly which includes a plurality of wires, a first housing component and a mateable second housing component, and for simultaneous mass termination of a plurality of terminals within the connector assembly to a portion of wire located within each terminal as a result of the mating of the housing components, each said portion defining an axis, said press tool comprising:

a frame;

first housing component support means on said frame for supporting said first housing component at a termination location;

a carrier member movably mounted on said frame;

cutting means mounted on said carrier member for cutting ea h of said plurality of wires to a predetermined length;

second housing component support means mounted on said carrier member for supporting said second housing component;

first moving means operatively associated with said second housing component support means for moving said second housing component relative to said first housing component when positioned at said termination location in a direction parallel to each of said axes to mate said first and second housing components together and thereby terminate each terminal to an individual conductor.

11. The press tool of claim 10 further comprising spacer means for establishing said predetermined length of wire and being mounted on said carrier member and movable from a first position adjacent said first housing component support means to a second position spaced from said first housing component support means.

12. The press tool of claim 4 wherein said spacer means comprises a block having a plurality of bores through which said plurality of wires can be located, the axes of said bores being generally parallel to the axes of said portions of the wires.

13. The press tool of claim 10 wherein said cutting means comprises a blade for cutting a row of wires simultaneously.

14. The press tool of claim 10 wherein said first and second housing components are mated along a first axis that is generally parallel to said aces and said press tool further comprises second moving means operatively associated with said second housing component support means for moving said second housing component support means from a second housing component loading station to a housing mating position, said housing mating position being located along said first axis.

15. A press tool for assembling an electrical connector assembly which includes a plurality of wires, a first housing component and a mateable second housing component, and for simultaneous mass termination of a plurality of terminals within the connector assembly to a portion of wire located within each terminal as a result of the mating of the housing components along a termination axis, said press tool comprising:

a frame;

first housing component support means positioned on said frame for supporting said first housing component;

a moveable carrier member mounted on said frame for rotational movement about a horizontal axis and about a vertical axis;

cutting means mounted on said carrier member for cutting each of said plurality of wires to a predetermined length;

spacer means mounted on said carrier member adjacent said cutting means for establishing said predetermined length of wire;

second housing component support means mounted on said carrier member for supporting said second housing component;

first cam means operatively associated with said carrier member for rotating said carrier member about said vertical axis to move said spacer means and said cutting means from a first position aligned with said termination axis to a second position spaced from said termination axis; and second cam means operatively associated with said carrier member for rotating said carrier member about said horizontal axis to move said second housing component relative to said first housing component in a direction parallel to said termination axis to mate said first and second housing components together and thereby terminate each terminal to an individual conductor.

16. The press tool of claim 15 wherein said first cam means includes a channel and a pin that follows said channel with one of said channel and said pin being positioned on said carrier member.

17. The press tool of claim 15 further comprising a rotatable control member that includes said first and second cam means and a third cam means operatively associated with said carrier member for causing rotation of said carrier member about said horizontal axis to move said cutting means and said spacer means relatively away from said first housing component support means in a direction parallel to the termination axis, and said second cam means includes a channel located within said control member and said carrier member having a following pin located in said channel so that upon rotation of said control member, said carrier member is rotated about said vertical axis.

18. The press tool of claim 16 further comprising a rotatable control member that includes said first and second cam means and a third cam means operatively associated with said carrier member for causing rotation of said carrier member about said horizontal axis to move said cutting means and said spacer means relatively away from said first housing component support means in a direction parallel to the termination axis, and said second cam means includes a channel located within said control member and said carrier member having a following pin located in said channel so that upon rotation of said control member, said carrier member is rotated about said vertical axis.

* * * * *